United States Patent
Genner

(10) Patent No.: US 11,972,637 B2
(45) Date of Patent: Apr. 30, 2024

(54) SYSTEMS AND METHODS FOR LIVENESS-VERIFIED, BIOMETRIC-BASED ENCRYPTION

(71) Applicant: T Stamp Inc., Atlanta, GA (US)

(72) Inventor: Gareth Genner, Atlanta, GA (US)

(73) Assignee: T Stamp Inc., Atlanta, GA (US)

(*) Notice: Subject to any disclaimer, the term of this patent is extended or adjusted under 35 U.S.C. 154(b) by 74 days.

(21) Appl. No.: 17/401,504

(22) Filed: Aug. 13, 2021

(65) Prior Publication Data
US 2021/0374445 A1 Dec. 2, 2021

Related U.S. Application Data

(63) Continuation of application No. 16/403,106, filed on May 3, 2019, now Pat. No. 11,093,771.

(60) Provisional application No. 62/667,133, filed on May 4, 2018.

(51) Int. Cl.
*G06V 40/40* (2022.01)
*G06F 21/32* (2013.01)

(52) U.S. Cl.
CPC .............. *G06V 40/45* (2022.01); *G06F 21/32* (2013.01)

(58) Field of Classification Search
CPC .. G06V 40/50; G06V 40/40; G06Q 20/40145; G06Q 20/40975
See application file for complete search history.

(56) References Cited

U.S. PATENT DOCUMENTS

| | | |
|---|---|---|
| 6,836,554 B1 | 12/2004 | Bolle et al. |
| 7,120,607 B2 | 10/2006 | Bolle et al. |
| 7,412,081 B2 | 8/2008 | Doi |
| 7,773,784 B2 | 8/2010 | Boult |
| 7,822,631 B1 | 10/2010 | Vander Mey et al. |
| 8,010,460 B2 | 8/2011 | Work et al. |

(Continued)

FOREIGN PATENT DOCUMENTS

| | | |
|---|---|---|
| CN | 103930921 A | 7/2014 |
| EP | 3065366 A1 | 9/2016 |

(Continued)

OTHER PUBLICATIONS

Akhtar et al., Liveness Detection for Biometric Authentication in Mobile Applications, 2014 International Carnahan Conference on Security Technology (ICCST), 2014, pp. 1-6, DOI: 10.1109/CCST.2014.6986982.*

(Continued)

*Primary Examiner* — Guillermo M Rivera-Martinez
(74) *Attorney, Agent, or Firm* — Morris, Manning & Martin, LLP; Daniel E. Sineway, Esq.

(57) ABSTRACT

Systems and methods for encryption/decryption based on liveness-verified biometric data that cannot be stolen/spoofed. In various embodiments, the disclosed systems and methods facilitate encryption/decryption of data through controlling access to keys via liveness-verified biometric data. Liveness-verified biometric data may, in various embodiments, be derived from facial features, fingerprints, voice recognition, DNA, etc. Generally, if the liveness and identity of the requesting individual cannot be verified, then the individual will not be permitted to encrypt/decrypt data using the disclosed systems and methods.

20 Claims, 8 Drawing Sheets

EXEMPLARY SYSTEM PROCESS

(56) References Cited

U.S. PATENT DOCUMENTS

| | | |
|---|---|---|
| 8,249,314 B2 | 8/2012 | Bolle et al. |
| 8,312,291 B2 | 11/2012 | Golic et al. |
| 8,316,086 B2 | 11/2012 | Ufford et al. |
| 8,457,367 B1 | 6/2013 | Sipe et al. |
| 8,510,797 B2 | 8/2013 | Kasturi |
| 8,542,879 B1 | 9/2013 | Nechyba et al. |
| 8,675,926 B2 | 3/2014 | Zhang et al. |
| 8,724,856 B1 | 5/2014 | King |
| 8,965,066 B1 | 2/2015 | Derakhshani et al. |
| 9,070,088 B1 | 6/2015 | Baveja et al. |
| 9,147,117 B1 | 9/2015 | Madhu et al. |
| 9,173,101 B1 | 10/2015 | Angelov et al. |
| 9,262,725 B2 | 2/2016 | Butte et al. |
| 9,300,676 B2 | 3/2016 | Madhu et al. |
| 9,477,828 B2 | 10/2016 | Irie |
| 9,495,588 B2 | 11/2016 | Derakhshani et al. |
| 9,521,606 B1 | 12/2016 | Costa et al. |
| 9,596,088 B1* | 3/2017 | Oakes, III ............. H04L 9/0866 |
| 9,652,663 B2 | 5/2017 | Lau et al. |
| 9,679,212 B2 | 6/2017 | Kim et al. |
| 9,721,147 B1 | 8/2017 | Kapczynski |
| 9,838,388 B2 | 12/2017 | Mather et al. |
| 9,866,393 B1 | 1/2018 | Rush et al. |
| 10,019,561 B1 | 7/2018 | Shelton et al. |
| 10,049,287 B2 | 8/2018 | Holz et al. |
| 10,210,388 B2 | 2/2019 | Derakhshani et al. |
| 10,225,255 B1 | 3/2019 | Jampani et al. |
| 10,275,684 B2 | 4/2019 | Han et al. |
| 10,320,569 B1 | 6/2019 | Wentz et al. |
| 10,430,638 B2 | 10/2019 | Russo |
| 10,594,688 B2 | 3/2020 | Yang et al. |
| 10,628,700 B2 | 4/2020 | Puri et al. |
| 10,635,894 B1 | 4/2020 | Genner |
| 10,650,226 B2 | 5/2020 | Chu et al. |
| 10,733,424 B2 | 8/2020 | Son et al. |
| 10,735,205 B1 | 8/2020 | Wentz et al. |
| 10,796,178 B2 | 10/2020 | Fan et al. |
| 10,810,423 B2 | 10/2020 | Thavalengal |
| 10,885,525 B1* | 1/2021 | Sharafi ............... G06Q 20/3674 |
| 11,080,516 B1 | 8/2021 | Joshi et al. |
| 11,080,517 B2 | 8/2021 | Wu et al. |
| 11,093,771 B1 | 8/2021 | Genner |
| 11,095,631 B1 | 8/2021 | Genner |
| 11,151,468 B1 | 10/2021 | Chen et al. |
| 11,531,737 B1* | 12/2022 | Boyd ................... G06F 16/2455 |
| 2004/0019570 A1 | 1/2004 | Bolle et al. |
| 2004/0096085 A1 | 5/2004 | Matsumoto et al. |
| 2004/0186906 A1 | 9/2004 | Torrant et al. |
| 2005/0235148 A1* | 10/2005 | Scheidt ............... G06Q 20/3829 |
| | | 713/168 |
| 2005/0240779 A1* | 10/2005 | Aull .......................... H04L 9/32 |
| | | 713/186 |
| 2006/0015358 A1 | 1/2006 | Chua |
| 2006/0042483 A1 | 3/2006 | Work et al. |
| 2006/0114520 A1 | 6/2006 | Enomoto et al. |
| 2006/0212931 A1 | 9/2006 | Shull et al. |
| 2007/0174633 A1 | 7/2007 | Draper et al. |
| 2008/0310727 A1 | 12/2008 | Wu et al. |
| 2008/0313714 A1 | 12/2008 | Fetterman et al. |
| 2009/0022374 A1 | 1/2009 | Boult |
| 2009/0080717 A1 | 3/2009 | Dias |
| 2009/0210722 A1 | 8/2009 | Russo |
| 2009/0271634 A1 | 10/2009 | Boult et al. |
| 2009/0287930 A1* | 11/2009 | Nagaraja ............... H04L 9/3231 |
| | | 380/255 |
| 2009/0310830 A1 | 12/2009 | Bolle et al. |
| 2009/0327054 A1 | 12/2009 | Yao et al. |
| 2010/0017618 A1 | 1/2010 | Golic et al. |
| 2010/0194919 A1 | 8/2010 | Ishii et al. |
| 2010/0250676 A1 | 9/2010 | Ufford et al. |
| 2011/0099277 A1 | 4/2011 | Yao et al. |
| 2011/0131643 A1 | 6/2011 | Lawrence et al. |
| 2011/0137789 A1 | 6/2011 | Kortina et al. |
| 2011/0246766 A1* | 10/2011 | Orsini ................... H04L 9/0894 |
| | | 713/160 |
| 2011/0285748 A1 | 11/2011 | Slatter et al. |
| 2012/0011066 A1 | 1/2012 | Telle et al. |
| 2012/0014507 A1 | 1/2012 | Wu et al. |
| 2012/0072384 A1 | 3/2012 | Schreiner et al. |
| 2012/0102332 A1 | 4/2012 | Mullin |
| 2012/0124651 A1 | 5/2012 | Ganesan et al. |
| 2012/0130863 A1 | 5/2012 | Tedjamulia et al. |
| 2012/0284786 A1 | 11/2012 | Somani et al. |
| 2012/0331567 A1 | 12/2012 | Shelton |
| 2013/0004033 A1 | 1/2013 | Trugenberger |
| 2013/0086641 A1 | 4/2013 | Mehr et al. |
| 2013/0103951 A1* | 4/2013 | Klevan ................. H04L 9/3268 |
| | | 713/186 |
| 2013/0104202 A1 | 4/2013 | Yin et al. |
| 2013/0124644 A1 | 5/2013 | Hunt et al. |
| 2013/0191898 A1 | 7/2013 | Kraft |
| 2013/0219479 A1 | 8/2013 | DeSoto et al. |
| 2013/0259228 A1 | 10/2013 | Ren et al. |
| 2013/0262873 A1 | 10/2013 | Read et al. |
| 2014/0013422 A1 | 1/2014 | Janus et al. |
| 2014/0020073 A1 | 1/2014 | Ronda et al. |
| 2014/0037074 A1 | 2/2014 | Bravo et al. |
| 2014/0037156 A1 | 2/2014 | Cavallini |
| 2014/0059660 A1 | 2/2014 | Marra et al. |
| 2014/0071131 A1 | 3/2014 | Kitago |
| 2014/0075513 A1 | 3/2014 | Trammel et al. |
| 2014/0090039 A1 | 3/2014 | Bhow |
| 2014/0101434 A1 | 4/2014 | Senthurpandi et al. |
| 2014/0129493 A1 | 5/2014 | Leopold |
| 2014/0143551 A1* | 5/2014 | Rothschild ............... G06F 21/32 |
| | | 713/189 |
| 2014/0164218 A1 | 6/2014 | Stewart |
| 2014/0230023 A1 | 8/2014 | Parks |
| 2014/0247985 A1 | 9/2014 | Park |
| 2014/0253707 A1 | 9/2014 | Gangadhar |
| 2014/0258305 A1 | 9/2014 | Kapadia et al. |
| 2014/0270404 A1 | 9/2014 | Hanna et al. |
| 2014/0273978 A1 | 9/2014 | Van Snellenberg |
| 2014/0279556 A1 | 9/2014 | Priebatsch et al. |
| 2014/0289833 A1 | 9/2014 | Briceno et al. |
| 2014/0330732 A1 | 11/2014 | Grignon |
| 2014/0333415 A1 | 11/2014 | Kursun |
| 2014/0337948 A1 | 11/2014 | Hoyos |
| 2015/0033305 A1* | 1/2015 | Shear ................... G06F 21/6218 |
| | | 726/11 |
| 2015/0046327 A1 | 2/2015 | Taupitz |
| 2015/0059003 A1 | 2/2015 | Bouse |
| 2015/0078630 A1 | 3/2015 | Derakhshani et al. |
| 2015/0121456 A1 | 4/2015 | Milman et al. |
| 2015/0154436 A1 | 6/2015 | Shi et al. |
| 2015/0156031 A1 | 6/2015 | Fadell et al. |
| 2015/0180857 A1 | 6/2015 | Schulman et al. |
| 2015/0186721 A1 | 7/2015 | Derakhshani et al. |
| 2015/0205800 A1 | 7/2015 | Work et al. |
| 2015/0227890 A1 | 8/2015 | Bednarek et al. |
| 2015/0261999 A1 | 9/2015 | Thiebot et al. |
| 2015/0269394 A1 | 9/2015 | Bringer et al. |
| 2015/0332169 A1 | 11/2015 | Bivens et al. |
| 2015/0347734 A1* | 12/2015 | Beigi ................... H04L 9/3268 |
| | | 726/28 |
| 2015/0379256 A1* | 12/2015 | Parry ................... H04L 9/0866 |
| | | 726/4 |
| 2016/0019614 A1 | 1/2016 | Dziuk |
| 2016/0034708 A1 | 2/2016 | Shim et al. |
| 2016/0037156 A1 | 2/2016 | Lee |
| 2016/0048670 A1* | 2/2016 | Kim ................... G06V 40/1353 |
| | | 382/125 |
| 2016/0048837 A1 | 2/2016 | Jin et al. |
| 2016/0050199 A1 | 2/2016 | Ganesan |
| 2016/0070704 A1 | 3/2016 | Yu |
| 2016/0085958 A1 | 3/2016 | Kang |
| 2016/0088023 A1 | 3/2016 | Handa et al. |
| 2016/0132901 A1 | 5/2016 | Davar et al. |
| 2016/0173605 A1 | 6/2016 | Iasi et al. |
| 2016/0191513 A1 | 6/2016 | Tomlinson et al. |
| 2016/0224853 A1 | 8/2016 | Xiong |
| 2016/0269178 A1 | 9/2016 | Yang et al. |
| 2016/0269402 A1* | 9/2016 | Carter ...................... H04L 9/30 |
| 2016/0277424 A1 | 9/2016 | Mawji et al. |

(56) References Cited

U.S. PATENT DOCUMENTS

| | | |
|---|---|---|
| 2016/0379182 A1 | 12/2016 | Sheng et al. |
| 2017/0006008 A1 | 1/2017 | Moran et al. |
| 2017/0019400 A1 | 1/2017 | Drolshagen et al. |
| 2017/0032485 A1 | 2/2017 | Vemury |
| 2017/0034183 A1 | 2/2017 | Enqvist et al. |
| 2017/0061138 A1 | 3/2017 | Lambert |
| 2017/0082740 A1 | 3/2017 | Kitchens, II et al. |
| 2017/0134366 A1 | 5/2017 | Genner et al. |
| 2017/0140204 A1 | 5/2017 | Derakhshani et al. |
| 2017/0210525 A1 | 7/2017 | Mayer et al. |
| 2017/0250796 A1 | 8/2017 | Samid |
| 2017/0256056 A1 | 9/2017 | Jain et al. |
| 2017/0264599 A1* | 9/2017 | O'Regan ............. H04W 12/068 |
| 2017/0279795 A1 | 9/2017 | Redberg |
| 2017/0286788 A1 | 10/2017 | Fan et al. |
| 2017/0331818 A1 | 11/2017 | Kader et al. |
| 2017/0346851 A1 | 11/2017 | Drake |
| 2017/0372055 A1 | 12/2017 | Robinson et al. |
| 2018/0005019 A1 | 1/2018 | Chattopadhyay et al. |
| 2018/0018651 A1 | 1/2018 | Nelson et al. |
| 2018/0034852 A1 | 2/2018 | Goldenberg |
| 2018/0048472 A1 | 2/2018 | Pirrwitz et al. |
| 2018/0060648 A1 | 3/2018 | Yoo et al. |
| 2018/0069703 A1* | 3/2018 | Chakraborty ......... H04L 9/3231 |
| 2018/0077571 A1 | 3/2018 | Mannopantar et al. |
| 2018/0082455 A1 | 3/2018 | Yamaji et al. |
| 2018/0097806 A1 | 4/2018 | Blinn |
| 2018/0101742 A1 | 4/2018 | Burge et al. |
| 2018/0167388 A1 | 6/2018 | Farrell et al. |
| 2018/0191501 A1 | 7/2018 | Lindemann |
| 2018/0205557 A1 | 7/2018 | Sun |
| 2018/0211092 A9 | 7/2018 | Derakhshani et al. |
| 2018/0248699 A1 | 8/2018 | Andrade |
| 2018/0253539 A1* | 9/2018 | Minter .................... G06F 21/64 |
| 2018/0302406 A1 | 10/2018 | Burckhardt et al. |
| 2018/0307895 A1 | 10/2018 | Chu et al. |
| 2018/0309581 A1* | 10/2018 | Butler ................. H04W 12/069 |
| 2019/0043148 A1 | 2/2019 | Vemury |
| 2019/0220583 A1* | 7/2019 | Douglas ................ G06V 40/70 |
| 2019/0266314 A1* | 8/2019 | Trelin .................. G06V 40/172 |
| 2019/0280862 A1* | 9/2019 | Crego .................. H04L 9/0866 |
| 2019/0311102 A1* | 10/2019 | Tussy ..................... G06F 21/32 |
| 2019/0312734 A1 | 10/2019 | Wentz et al. |
| 2019/0334884 A1 | 10/2019 | Ross et al. |
| 2019/0379541 A1 | 12/2019 | Schwach et al. |
| 2020/0036707 A1 | 1/2020 | Callahan et al. |
| 2020/0084191 A1 | 3/2020 | Nicholls |
| 2020/0145219 A1* | 5/2020 | Sebastian ............... G06F 21/32 |
| 2020/0153624 A1 | 5/2020 | Wentz et al. |
| 2020/0186350 A1 | 6/2020 | Wentz et al. |
| 2020/0201679 A1 | 6/2020 | Wentz |
| 2020/0218886 A1* | 7/2020 | Sheets .................... H04N 23/80 |
| 2020/0257889 A1 | 8/2020 | Merkel et al. |
| 2020/0293640 A1 | 9/2020 | Joshi et al. |
| 2020/0351089 A1 | 11/2020 | Wentz |
| 2020/0351098 A1 | 11/2020 | Wentz |
| 2020/0351657 A1 | 11/2020 | Wentz |
| 2020/0356085 A1 | 11/2020 | Wentz et al. |
| 2020/0404019 A1 | 12/2020 | Drake |
| 2021/0019519 A1 | 1/2021 | Martin et al. |
| 2021/0027080 A1 | 1/2021 | Storm et al. |
| 2021/0034729 A1* | 2/2021 | Chung .................... G06F 21/32 |
| 2021/0073518 A1 | 3/2021 | Kumar et al. |

FOREIGN PATENT DOCUMENTS

| | | | |
|---|---|---|---|
| WO | 2008010773 A1 | 1/2008 | |
| WO | WO-2016105728 A1 * | 6/2016 | ............. G06F 21/32 |
| WO | 2019034589 A1 | 2/2019 | |

OTHER PUBLICATIONS

Rathgeb et al., "Unlinkable Improved Multi-biometric Iris Fuzzy Vault", EURASIP Journal on Information Security, 2016, 2016:26.

Wonjun Kim, Face Liveness Detection From a Single Image via Diffusion Speed Model, IEEE Transactions on Image Processing, vol. 24, No. 8, Apr. 13, 2015, pp. 2456 to 2465.

Xinting Gao, Single-View Recaptured Image Detection Based on Physics-Based Features, 2010 IEEE International Conference on Multimedia and Expo, Jul. 19, 2010, pp. 1469 to 1474.

Di Wen, Face Spoof Detection with Image Distortion Analysis, IEEE Transactions on Information Forensics and Security, vol. 10, No. 4, Apr. 2015, pp. 746 to 761.

Rohit Kumar Pandey, Deep Secure Encoding for Face Template Protection, Conference on Computer Vision and Pattern Recognition Workshops, Jun. 26, 2016, pp. 77 to 83.

* cited by examiner

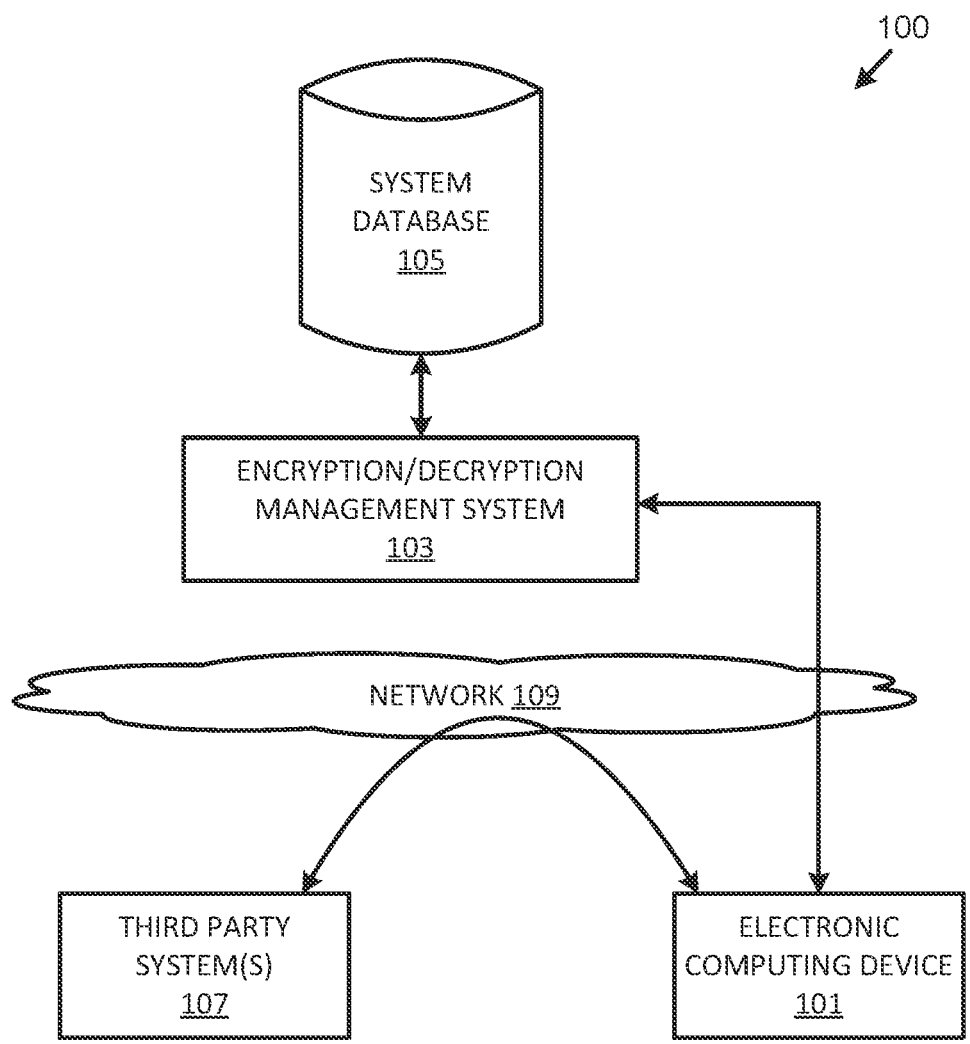
FIG 1: EXEMPLARY SYSTEM ARCHITECTURE

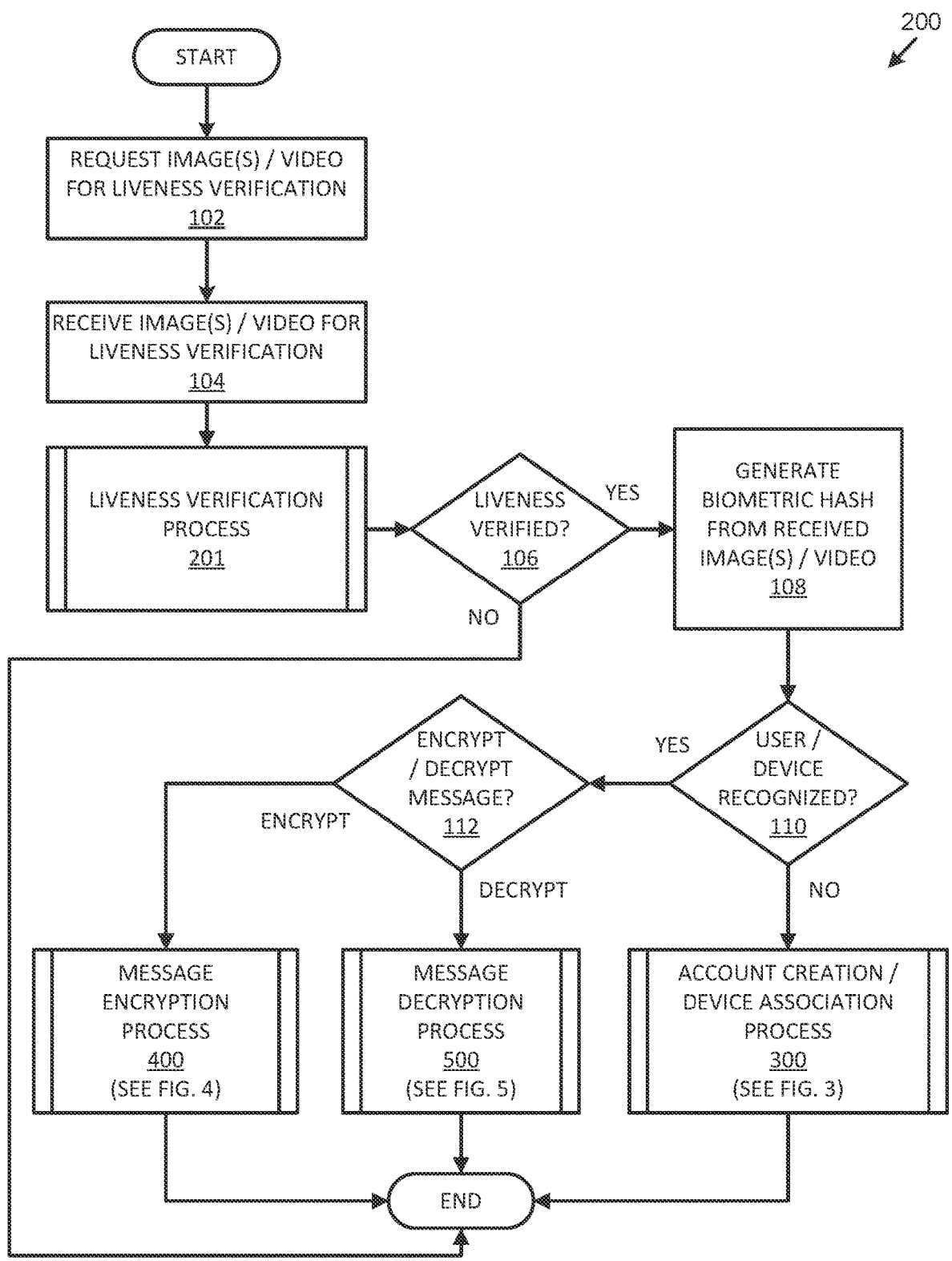
FIG 2: EXEMPLARY SYSTEM PROCESS

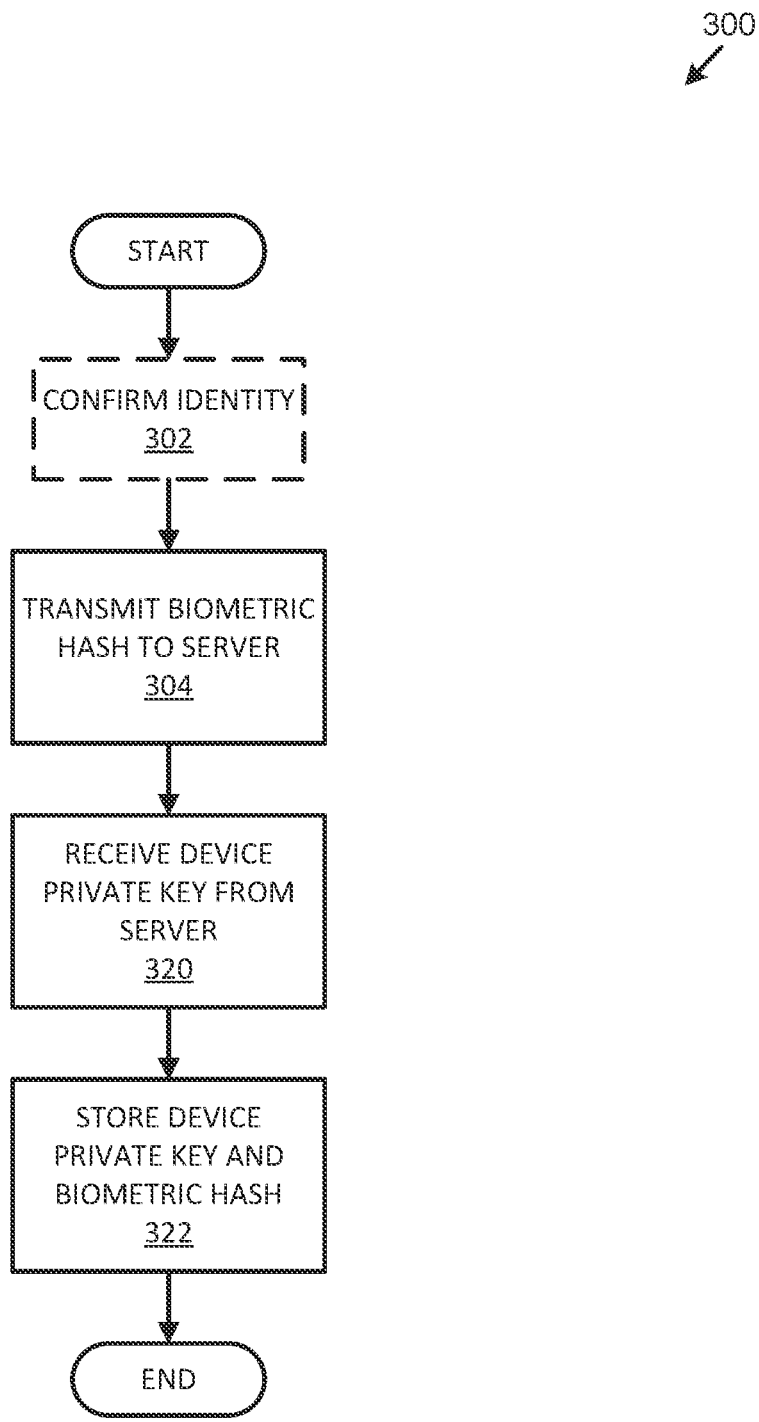
FIG 3A: EXEMPLARY ACCOUNT CREATION / DEVICE ASSOCIATION PROCESS – DEVICE PERSPECTIVE

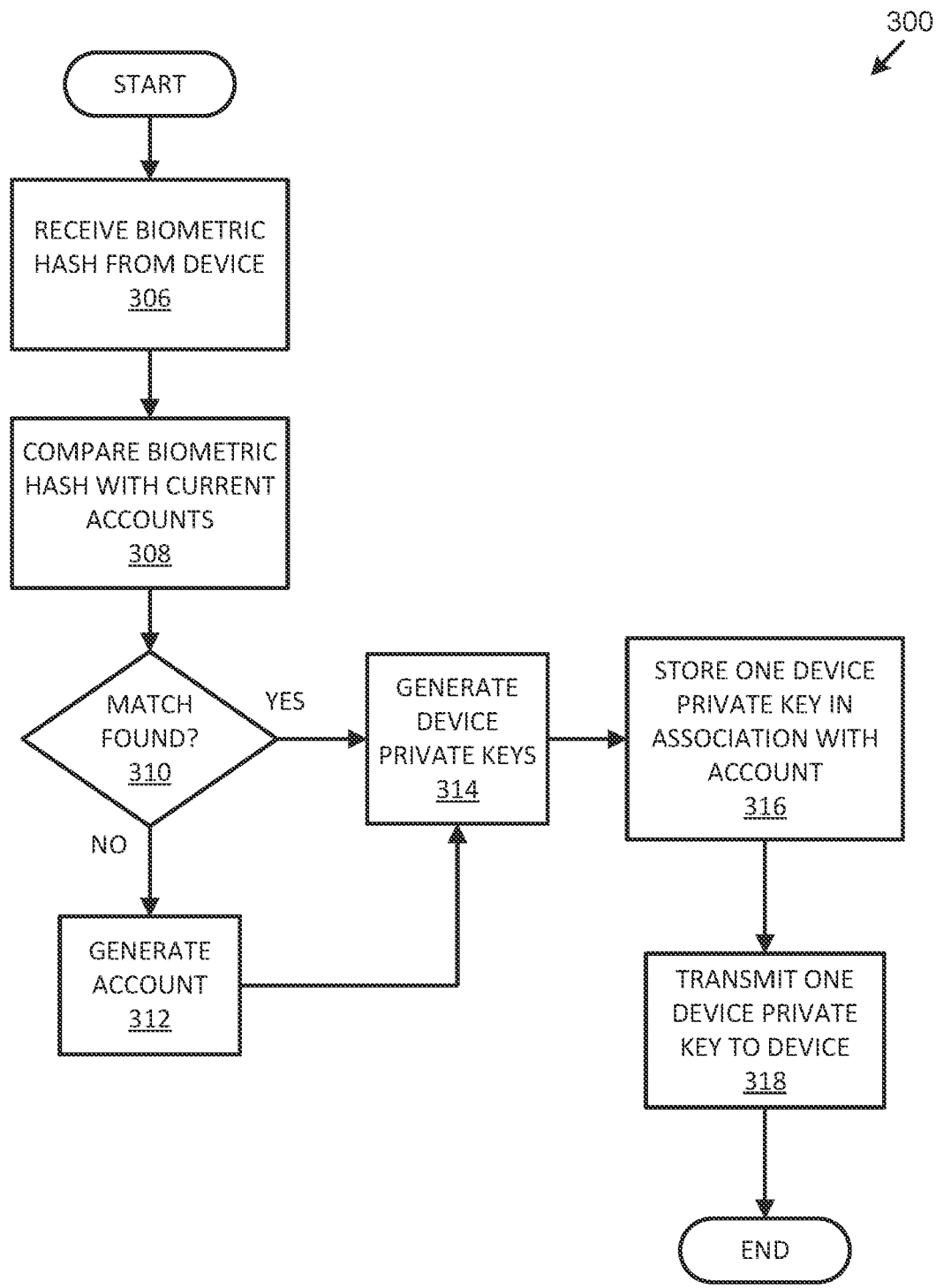
FIG 3B: EXEMPLARY ACCOUNT CREATION / DEVICE ASSOCIATION PROCESS – SERVER PERSPECTIVE

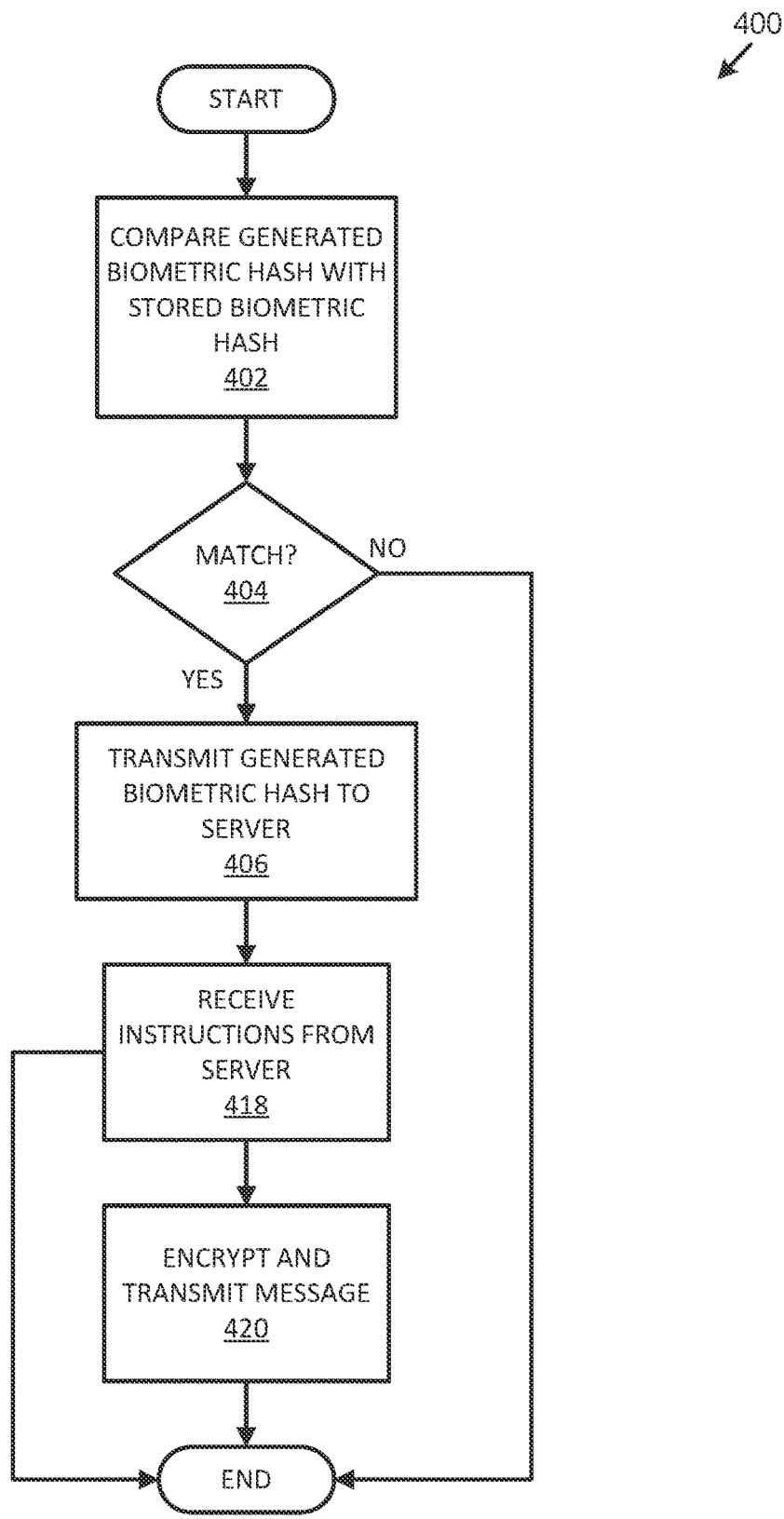
FIG 4A: EXEMPLARY MESSAGE ENCRYPTION PROCESS – DEVICE PERSPECTIVE

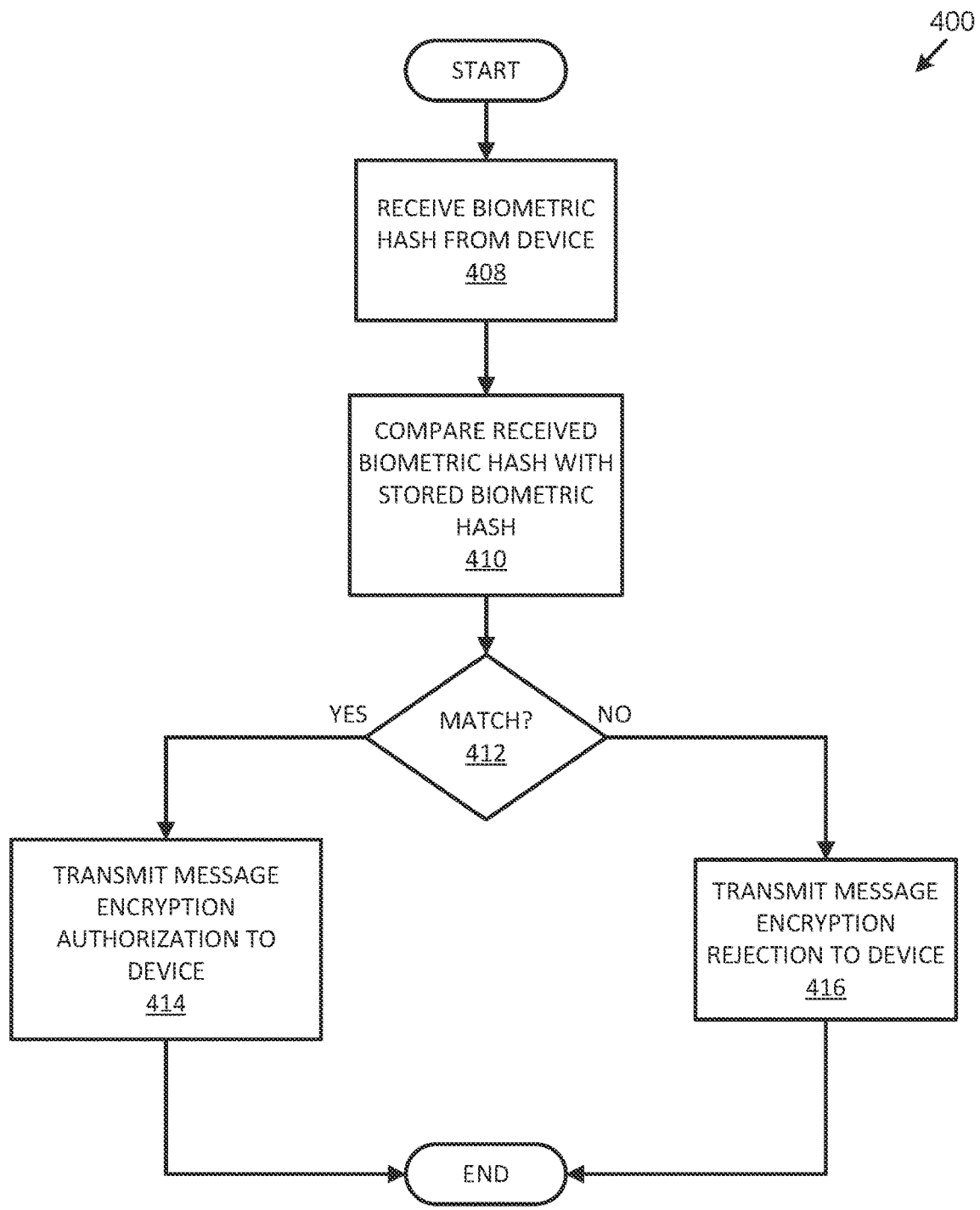
FIG 4B: EXEMPLARY MESSAGE ENCRYPTION PROCESS – SERVER PERSPECTIVE

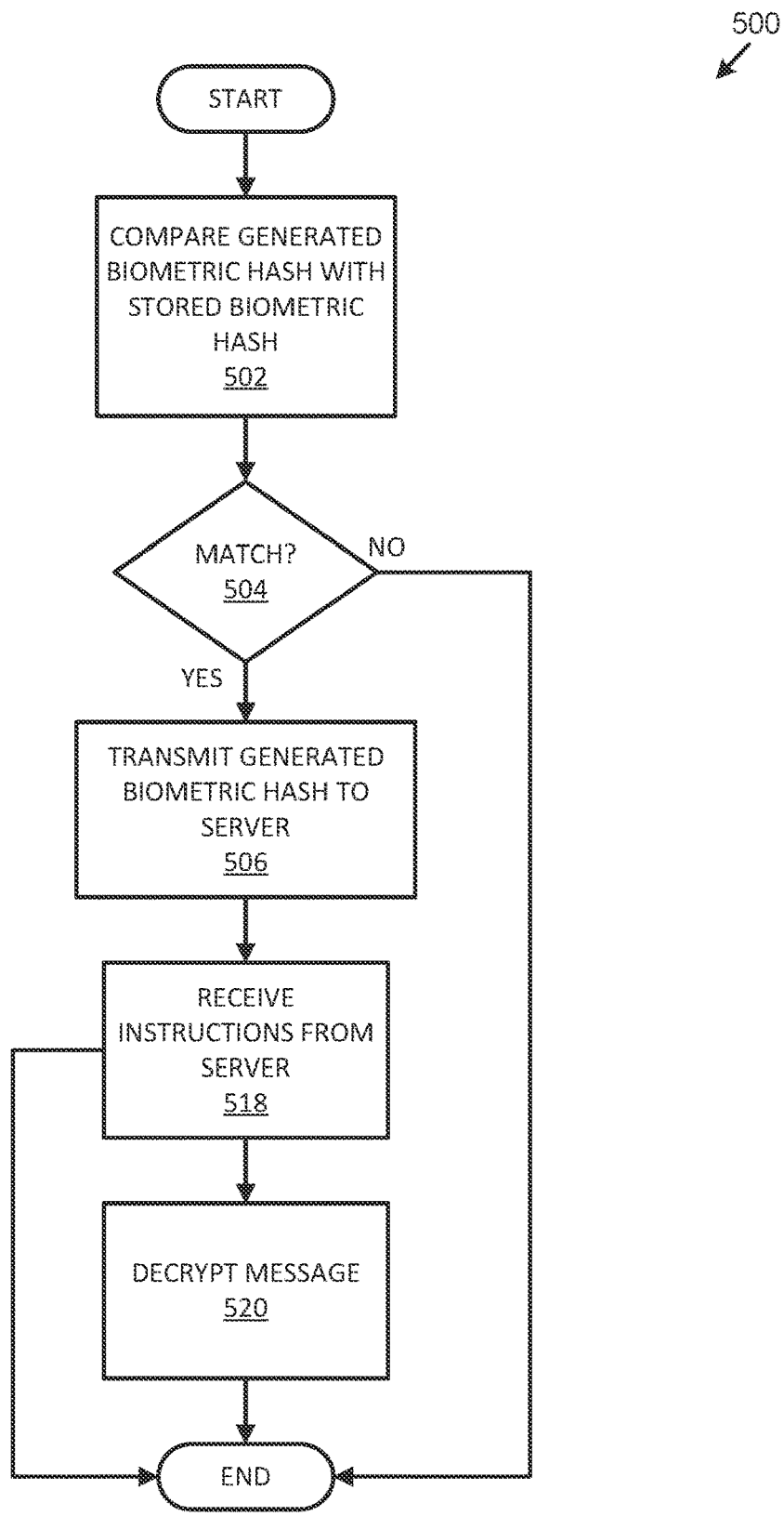
FIG 5A: EXEMPLARY MESSAGE DECRYPTION PROCESS – DEVICE PERSPECTIVE

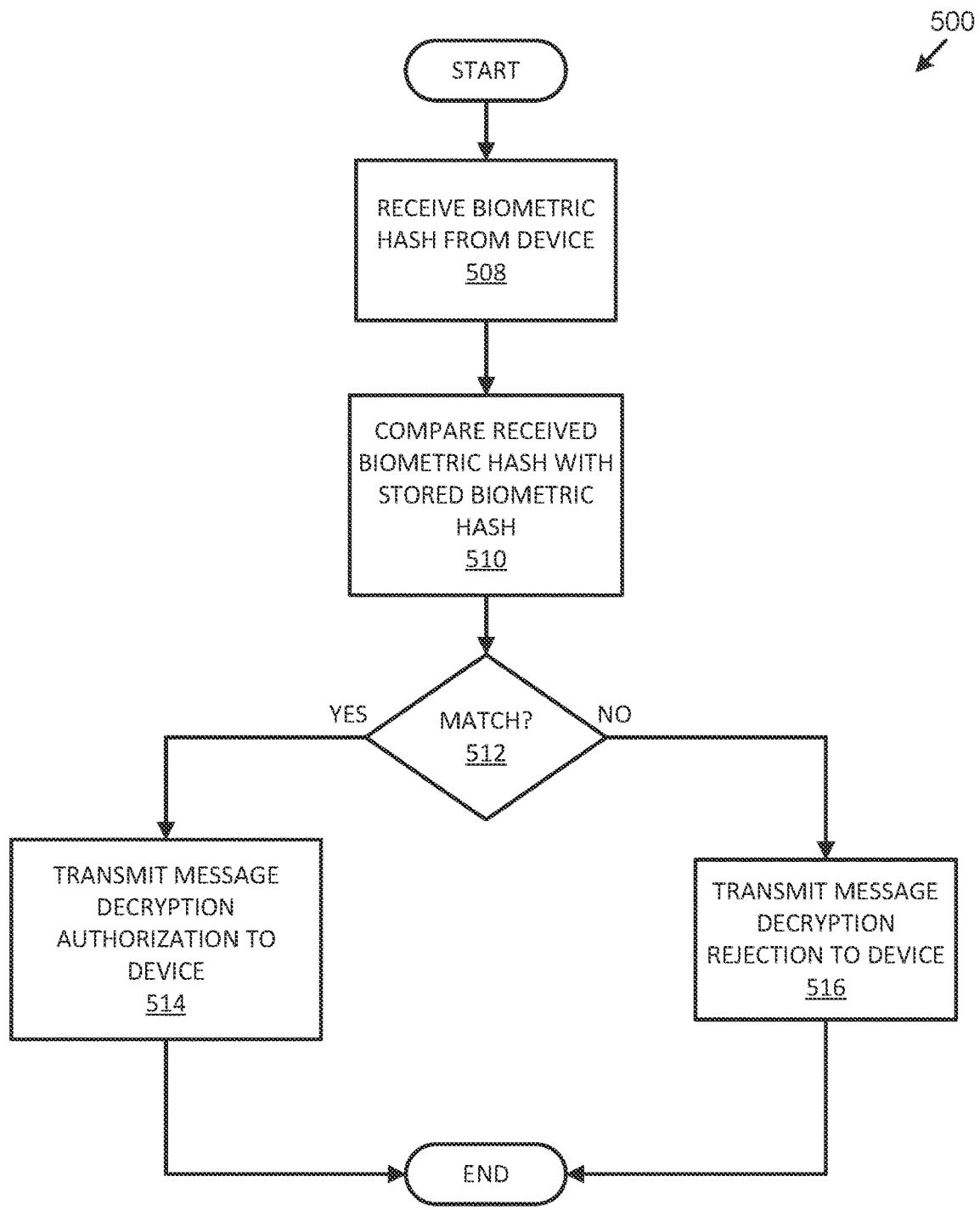
FIG 5B: EXEMPLARY MESSAGE DECRYPTION PROCESS – SERVER PERSPECTIVE

SYSTEMS AND METHODS FOR LIVENESS-VERIFIED, BIOMETRIC-BASED ENCRYPTION

CROSS REFERENCE TO RELATED APPLICATIONS

This application is a continuation of U.S. patent application Ser. No. 16/403,106, filed May 3, 2019, entitled "SYSTEMS AND METHODS FOR LIVENESS-VERIFIED, BIOMETRIC-BASED ENCRYPTION," which claims the benefit of, and priority to, U.S. Provisional Patent Application No. 62/667,133, filed on May 4, 2018, and entitled "SYSTEMS AND METHODS FOR LIVENESS-VERIFIED, BIOMETRIC-BASED ENCRYPTION," the disclosures of which are incorporated by reference herein in their entirety.

TECHNICAL FIELD

The present systems and methods relate generally to encryption and, more particularly, to encryption based on liveness-verified biometric data.

BACKGROUND

Access to sensitive electronic data is increasingly becoming a large and complex risk, financially and otherwise, for individuals, corporations, and governments alike. Malicious actors desiring to access that sensitive data employ a variety of creative methods to do so—intercepting the data in motion, impersonating authorized individuals to access the data at rest, brute-force hacking into the storage location of that data at rest, etc. Once data is encrypted, its security can be assured only so long as the access credentials for the key that decrypts the data remain secure. Access credentials (e.g., passwords, secured devices, etc.), however, regardless of the level of care taken, are almost always subject to a risk of being stolen/spoofed.

Therefore, there is a long-felt but unresolved need for a system or method that permits encryption/decryption based on liveness-verified biometric data that cannot be stolen/spoofed.

BRIEF SUMMARY OF THE DISCLOSURE

Briefly described, and according to one embodiment, aspects of the present disclosure generally relate to systems and methods for encryption/decryption based on liveness-verified biometric data that cannot be stolen/spoofed.

In various embodiments, the disclosed system facilitates encryption/decryption of data through controlling access to encryption/decryption keys via liveness-verified biometric data (e.g., data that has been verified as derived from the correct actual live individual to avoid bad actors spoofing the data to gain access to the encryption/decryption keys). Liveness-verified biometric data may, in various embodiments, be derived from facial features, fingerprints, voice recognition, DNA, etc. Generally, the disclosed system improves the robustness and security of encryption/decryption systems by ensuring that only the proper authorized individuals can access the system (with credentials that cannot be stolen or spoofed).

Generally, in one embodiment, the system requests that an individual who desires to encrypt/decrypt data take a photo/video of his/her face for liveness verification (e.g., determining whether the photo/video has been spoofed or is of an actual live individual). In various embodiments, the system may determine if a photo/video has been spoofed via techniques described in U.S. patent application Ser. No. 15/782,940, entitled "Systems and Methods for Passive-Subject Liveness Verification in Digital Media," filed on Oct. 13, 2017, the entire disclosure of which is herein incorporated by reference. Once liveness of the photo/video is confirmed, in one embodiment, a biometric hash of the individual's face (e.g., a hash of the prominent facial features of the individual, generated by running a representation of the features through a cryptographic hashing algorithm, such as, but not limited to, SHA-1, MD-5, etc.) is generated for identity verification of the individual through a comparison to one or more stored biometric hashes corresponding to the individual. In one embodiment, if the identity of the individual is verified, then the individual is provided access to the relevant encryption/decryption keys. Generally, if the liveness and identity of the requesting individual cannot be verified, then the individual will not be permitted to encrypt/decrypt data using the system. In this manner, the disclosed system improves the security of the encrypted data by allowing access only to a live individual with authorized biometric features, resulting in access credentials that cannot be stolen/spoofed.

For example, consider a scenario where a user at a mobile phone is sending an email. Rather than allowing for the user to send the email simply because he/she has unlocked/logged-into the mobile phone, the systems and methods discussed herein may verify the user's identity prior to sending the email, thus preventing an unauthorized party from sending an email under the user's identity. Furthermore, the systems and methods discussed herein may encrypt the email prior to transmitting the email to the recipient, and the email may only be decrypted if the recipient's identity is also verified (via liveness verification). Accordingly, the systems and methods discussed herein allow for a trusted environment for sending data, such as emails, safely.

The system generally places no limitations on the types of data that may be encrypted/decrypted (e.g., data in motion, in rest, documents, images, videos, etc.). Further, the system places no limitations on the types of encryption/decryption that may be conducted on that data. Generally, encryption is performed by inputting the original data and a key into a cryptographic algorithm such as, but not limited to, Advanced Encryption Standard (AES), RSA, Blowfish, etc., to generate an encrypted output of the original data, generally in ciphertext. Decryption is generally performed by inputting the encrypted output and a key into the cryptographic algorithm to generate a decrypted version of the encrypted output, generally corresponding to the original data.

In various embodiments, the present disclosure describes a method for biometric-based encryption, including the steps of: receiving, at an electronic computing device, liveness media corresponding to a user at the electronic computing device, wherein the liveness media includes biometric data including a picture and/or video of the user captured via the mobile computing device; generating a biometric hash corresponding to the liveness media; transmitting the generated biometric hash to a server; comparing the generated biometric hash to one or more stored biometric hashes of the user at the server, wherein comparing the generated biometric hash to the one or more stored biometric hashes includes determining if the generated biometric hash and the one or more stored biometric hashes match within a predetermined threshold; and in response to determining a match within the predetermined threshold, transmitting encryption and/or decryption instructions to the electronic computing device.

In particular embodiments, the method further includes the steps of: prior to receiving the liveness media, receiving a user-initiated request for encryption and/or decryption at the electronic computing device; and generating a request for the liveness media at the electronic computing device for liveness verification of the user. In one embodiment, the predetermined threshold corresponds to a predetermined security level of the server. In certain embodiments, the one or more stored biometric hashes include initial hashes generated in response to the user establishing an account with the server. In at least one embodiment, the initial hashes are generated with initial liveness media.

In various embodiments, two private keys are generated in association with the initial hashes, and wherein a first private key of the two private keys is stored at the server in a user device account, and a second private key of the two private keys is transmitted to the electronic computing device. In some embodiments, the encryption and/or decryption instructions include an authorization token for allowing the electronic computing device to perform the encryption and/or decryption via the second private key. In certain embodiments, the encryption and/or decryption are performed on an email, batch of files, or physical asset.

In one embodiment, the liveness media is unique to the user. In certain embodiments, the generated biometric hash and the one or more stored biometric hashes are generated by the SHA-1 and/or MD-5 cryptographic hashing algorithms. In a particular embodiment, the method further includes the step of verifying, at the electronic computing device, the liveness of the user via the liveness media. In at least one embodiment, prior to transmitting the generated biometric hash to the server, the generated biometric has is compared to one or more stored biometric hashes of the user at the electronic computing device.

In various embodiments, the present disclosure describes a system for biometric-based encryption: a server for encryption and decryption management; and an electronic computing device associated with a user, wherein the electronic computing device includes a processor operable to: receive liveness media corresponding to the user at the electronic computing device, wherein the liveness media includes biometric data including a picture and/or video of the user captured via the mobile computing device; generate a biometric hash corresponding to the liveness media; transmit the generated biometric hash to the server, wherein the generated biometric hash is compared to one or more stored biometric hashes of the user at the server, and wherein comparing the generated biometric hash to the one or more stored biometric hashes includes determining if the generated biometric hash and the one or more stored biometric hashes match within a predetermined threshold; and in response to determining a match within the predetermined threshold, receive encryption and/or decryption instructions from the server at the electronic computing device.

In one embodiment, the processor is further operable to: prior to receiving the liveness media, receive a user-initiated request for encryption and/or decryption at the electronic computing device; and generate a request for the liveness media at the electronic computing device for liveness verification of the user. In a particular embodiment, the predetermined threshold corresponds to a predetermined security level of the server. In certain embodiments, the one or more stored biometric hashes include initial hashes generated in response to the user establishing an account with the server. In at least one embodiment, the initial hashes are generated with initial liveness media.

According to various aspects of the present disclosure, two private keys are generated in association with the initial hashes, and wherein a first private key of the two private keys is stored at the server in a user device account, and a second private key of the two private keys is transmitted to the electronic computing device. In particular embodiments, the encryption and/or decryption instructions include an authorization token for allowing the electronic computing device to perform the encryption and/or decryption via the second private key. In certain embodiments, the encryption and/or decryption are performed on an email, batch of files, or physical asset.

In one embodiment, the liveness media is unique to the user. In various embodiments, the generated biometric hash and the one or more stored biometric hashes are generated by the SHA-1 and/or MD-5 cryptographic hashing algorithms. In certain embodiments, the processor is further operable to verify, at the electronic computing device, the liveness of the user via the liveness media. Furthermore, in particular embodiments, prior to transmitting the generated biometric hash to the server, the generated biometric has is compared to one or more stored biometric hashes of the user at the electronic computing device.

In at least one embodiment, the present disclosure describes a method for liveness-verified biometric-based encryption and decryption, including the steps of: receiving, at an electronic computing device, liveness media corresponding to a user at the electronic computing device, wherein the liveness media includes biometric data including a picture and/or video of the user captured via the mobile computing device; verifying the liveness of the user at the electronic computing device; generating a hash, at the electronic computing device, based on the received biometric data; comparing the generated hash to one or more stored hashes at the electronic computing device for verifying the identity of the user; in response to verifying the identity of the user, transmitting the generated hash to a server for encryption and decryption management; comparing the generated hash to one or more stored hashes at the server for determining encryption and/or decryption instructions; in response to determining a match between the generated hash and the one or more stored hashes at the server, generating the encryption and/or decryption instructions based on the match; and transmitting the encryption and/or decryption instructions to the electronic computing device, wherein the encryption and/or decryption instructions provide access to a protected item at the electronic computing device.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary system architecture, according to one embodiment of the present disclosure.

FIG. 2 is a flowchart showing an exemplary system process, according to one embodiment of the present disclosure.

FIG. 3 (consisting of FIGS. 3A and 3B) is a flowchart showing an exemplary account creation/device association process, according to one embodiment of the present disclosure.

FIG. 4 (consisting of FIGS. 4A and 4B) is a flowchart showing an exemplary message encryption process, according to one embodiment of the present disclosure.

FIG. 5 (consisting of FIGS. 5A and 5B) is a flowchart showing an exemplary message decryption process, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and methods for encryption/decryption based on liveness-verified biometric data that cannot be stolen/spoofed.

In various embodiments, the disclosed system facilitates encryption/decryption of data through controlling access to encryption/decryption keys via liveness-verified biometric data (e.g., data that has been verified as derived from the correct actual live individual to avoid bad actors spoofing the data to gain access to the encryption/decryption keys). Liveness-verified biometric data may, in various embodiments, be derived from facial features, fingerprints, voice recognition, DNA, etc. Generally, the disclosed system improves the robustness and security of encryption/decryption systems by ensuring that only the proper authorized individuals can access the system (with credentials that cannot be stolen or spoofed).

Generally, in one embodiment, the system requests that an individual who desires to encrypt/decrypt data take a photo/video of his/her face for liveness verification (e.g., determining whether the photo/video has been spoofed or is of an actual live individual). In various embodiments, the system may determine if a photo/video has been spoofed via techniques described in U.S. patent application Ser. No. 15/782,940, entitled "Systems and Methods for Passive-Subject Liveness Verification in Digital Media," filed on Oct. 13, 2017, the entire disclosure of which is herein incorporated by reference. Once liveness of the photo/video is confirmed, in one embodiment, a biometric hash of the individual's face (e.g., a hash of the prominent facial features of the individual, generated by running a representation of the features through a cryptographic hashing algorithm, such as, but not limited to, SHA-1, MD-5, etc.) is generated for identity verification of the individual through a comparison to one or more stored biometric hashes corresponding to the individual. In one embodiment, if the identity of the individual is verified, then the individual is provided access to the relevant encryption/decryption keys. Generally, if the liveness and identity of the requesting individual cannot be verified, then the individual will not be permitted to encrypt/decrypt data using the system. In this manner, the disclosed system improves the security of the encrypted data by allowing access only to a live individual with authorized biometric features, resulting in access credentials that cannot be stolen/spoofed.

For example, consider a scenario where a user at a mobile phone is sending an email. Rather than allowing for the user to send the email simply because he/she has unlocked/logged-into the mobile phone, the systems and methods discussed herein may verify the user's identity prior to sending the email, thus preventing an unauthorized party from sending an email under the user's identity. Furthermore, the systems and methods discussed herein may encrypt the email prior to transmitting the email to the recipient, and the email may only be decrypted if the recipient's identity is also verified (via liveness verification). Accordingly, the systems and methods discussed herein allow for a trusted environment for sending data, such as emails, safely.

The system generally places no limitations on the types of data that may be encrypted/decrypted (e.g., data in motion, in rest, documents, images, videos, etc.). Further, the system places no limitations on the types of encryption/decryption that may be conducted on that data. Generally, encryption is performed by inputting the original data and a key into a cryptographic algorithm such as, but not limited to, Advanced Encryption Standard (AES), RSA, Blowfish, etc., to generate an encrypted output of the original data, generally in ciphertext. Decryption is generally performed by inputting the encrypted output and a key into the cryptographic algorithm to generate a decrypted version of the encrypted output, generally corresponding to the original data.

Exemplary Embodiments

Referring now to the figures, for the purposes of example and explanation of the fundamental processes and components of the disclosed systems and methods, reference is made to FIG. 1, which illustrates an exemplary architecture 100 of one embodiment of the present disclosure. As will be understood and appreciated, the exemplary architecture 100 shown in FIG. 1 represents merely one approach or embodiment of the present system, and other aspects are used according to various embodiments of the present system. Generally, the disclosed system 100 facilitates encryption/decryption of data through controlling access to encryption/decryption keys via liveness-verified biometric data. Liveness-verified biometric data may, in various embodiments, be derived from facial features, fingerprints, voice recognition, DNA, or any other individual-specific/unique biometric data.

In various embodiments, the disclosed system 100 includes an electronic computing device 101 operatively connected to an encryption/decryption management system 103 (including a system database 105) and a third party system 107 via a network 109 for encryption/decryption based on liveness-verified biometric data that cannot be stolen/spoofed.

For example, in one practical application and non-limiting embodiment, an individual wants to send an encrypted email using his/her cell phone 101. Generally, the individual drafts the email and, when ready to send the drafted email, chooses to encrypt the email according to the techniques discussed in the present disclosure. In one embodiment, the phone 101 requests that that the individual take a photo/video of his/her face for liveness verification (e.g., determining whether the photo/video has been spoofed or is of a live individual). Once liveness of the photo/video is confirmed, in one embodiment, a biometric hash of the individual's face (e.g., a hash of the prominent facial features of the individual, generated by running a representation of the features through a cryptographic hashing algorithm) is generated by the phone 101 for identity verification of the individual through a comparison to one or more stored biometric hashes corresponding to the individual from the phone 101 and/or encryption/decryption management system 103. In one embodiment, if the identity of the individual is verified, then the email is encrypted using an encryption key from the encryption/decryption management system 103 (in one embodiment, the public key of the intended recipient, also a user of the encryption/decryption management system 103) and transmitted to the third party system 107 corresponding to the recipient of the email. Generally, if the liveness and identity of the sender cannot be verified, then the individual will not be permitted to encrypt the email, the attempt will be logged, etc. In this manner, the disclosed system improves the security of the encrypted email by allowing only a live individual with authorized biometric features to encrypt the email.

Similarly, in one non-limiting embodiment, the recipient of the encrypted email who wants to read it using his/her cell phone 101 will request decryption of the email. In one embodiment, the phone 101 requests that that the individual take a photo/video of his/her face for liveness verification (e.g., determining whether the photo/video has been spoofed or is of a live individual). Once liveness of the photo/video is confirmed, in one embodiment, a biometric hash of the individual's face (e.g., a hash of the prominent facial features of the individual, generated by running a representation of the features through a cryptographic hashing algorithm) is generated by the phone 101 for identity verification of the individual through a comparison to one or more stored biometric hashes corresponding to the individual from the phone 101 and/or the encryption/decryption management system 103. In one embodiment, if the identity of the individual is verified, then the email is decrypted using a decryption key from the encryption/decryption management system 103 (in one embodiment, the private key corresponding to the recipient) so that the recipient can read the email on his/her phone 101. Generally, if the liveness and identity of the recipient cannot be verified, then the individual will not be permitted to decrypt the email. In this manner, the disclosed system improves the security of the encrypted email by allowing access only to a live individual with authorized biometric features (e.g., the intended recipient), resulting in access credentials that cannot be stolen/spoofed.

The system generally places no limitations on the types of data that may be encrypted/decrypted (e.g., data in motion, in rest, documents, videos, images, etc.). Further, the system places no limitations on the types of encryption/decryption that may be conducted on that data. Generally, encryption is performed by inputting the original data and a key into a cryptographic algorithm such as, but not limited to, AES, RSA, Blowfish, etc., to generate an encrypted output of the original data, generally in ciphertext. Decryption is generally performed by inputting the encrypted output and a key into the cryptographic algorithm to generate a decrypted version of the encrypted output, generally corresponding to the original data.

Generally, the electronic computing device 101 is any device that is capable of performing the functionality disclosed herein (e.g., desktop computer, laptop computer, tablet computer, smartphone, smartwatch, camera, video camera, image capture device, etc.). In various embodiments, the electronic computing device 101 communicates via network 109 with the encryption/decryption management system 103 and the third party system 107 as part of the system process 200 (to be discussed herein). In one embodiment, the electronic computing device 101 is the device through which the user is attempting to encrypt/decrypt data and via which the image is taken for which liveness verification is requested and from which the liveness-verified biometric data is derived. In one embodiment, the electronic computing device 101 has a camera or other image capture device and takes the image in real time with the request to encrypt/decrypt data.

Generally, the encryption/decryption management system 103 may be any computing device (e.g., desktop computer, laptop, servers, tablets, etc.), combination of computing devices, software, hardware, or combination of software and hardware that is capable of performing the functionality disclosed herein. In various embodiments, the encryption/decryption management system 103 is operatively connected to the electronic computing device 101 via the network 109 to conduct the processes/analyses disclosed herein. In one embodiment, the encryption/decryption management system 103 further includes the system database 105. Generally, the system database 105 may be any computing device (e.g., desktop computer, laptop, servers, tablets, etc.), combination of computing devices, software, hardware, combination of software and hardware, database (e.g., stored in the cloud or on premise, structured as relational, etc.), or combination of databases that is capable of performing the functionality disclosed herein. In one embodiment, the system database 105 is local to the encryption/decryption management system 103 (e.g., the encryption/decryption management system 103 includes the system database 105, etc.). In other embodiments, the system database 105 is virtual or stored in the "cloud." In one embodiment, the system database 105 includes biometric hashes and keys for encryption/decryption.

Generally, the third party system 107 may be any computing device (e.g., desktop computer, laptop, servers, tablets, etc.), combination of computing devices, software, hardware, or combination of software and hardware that is capable of performing the functionality disclosed herein. In various embodiments, the third party system 107 communicates via network 109 with the electronic computing device 101 as part of the system process 200. In one embodiment, the third party system 107 receives encrypted data from the electronic computing device 101. In one embodiment, the third party system 107 facilitates confirmation of the identity of the user of the electronic computing device 101.

Generally, the network 109 may be any connection capable of transferring data between two or more computer systems (e.g., a secure or unsecured connection, Bluetooth, wireless or wired local-area networks (LANs), cell network, the Internet, etc.).

FIG. 2 is a flowchart showing an exemplary system process 200, according to one embodiment of the present disclosure. As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown. Generally, the exemplary system process 200 is the process by which encryption/decryption is performed on previously-generated data based on liveness-verified biometric data that cannot be stolen/spoofed.

In various embodiments, the exemplary system process 200 begins at step 102, wherein the system requests an image/video for liveness verification after an individual has attempted to access the system. The user requesting encryption/decryption will take the requested image/video (e.g., using the electronic computing device 101 to take a photo/video of the user's face, moving the electronic computing device 101 as instructed to change the perspective of the photo/video, performing any other acts as instructed, etc.), wherein the system receives it at step 104. Generally, the system conducts a liveness verification process 201 on the received image/video to determine whether it is of a live individual (e.g., hasn't been spoofed) using various algorithms (e.g., machine learning algorithms, etc.). Further details of the liveness verification process 201 are discussed in U.S. patent application Ser. No. 15/782,940, entitled "Systems and Methods for Passive-Subject Liveness Verification in Digital Media," filed Oct. 13, 2017, the entire disclosure of which is herein incorporated by reference.

After the liveness verification process 201, the system determines, at step 106, whether the received image/video is of a live individual. If liveness is not verified, then the exemplary system process 200 ends thereafter. If, however, liveness is verified, then the system proceeds, at step 108, to generate a biometric hash based on the received image/video (e.g., a hash of the prominent facial features of the individual, generated by running a representation of the features through a cryptographic hashing algorithm, such as, but not limited to, SHA-1, MD-5, etc.). In certain embodiments, if liveness is not verified at step 106, rather than the process 200 ending, the system may perform other actions such as logging the liveness verification attempt, prompting the user to retake the picture or video, generating an alert corresponding to the failed liveness verification, etc.

In various embodiments, after generating the biometric hash at step 108, the system determines, at step 110, whether the biometric hash matches any known individual associated with the device that generated the received image/video (e.g., whether the individual in the photograph is an authorized user of the device and/or system) by comparing the generated biometric hash to any biometric hashes stored on the device. In one embodiment, the generated biometric hash is compared to any biometric hashes stored at the server or in the cloud. As will be appreciated by one having ordinary skill in the art, the generated biometric hash, generated from biometric features that may be slightly different due to the physical conditions of the photograph (e.g., lighting, resolution, etc.), may not be identical to the stored biometric hash. Thus, in one embodiment, the system may permit biometric hashes within a certain threshold to be considered a match (e.g., 90% likelihood of match, 80%, etc.), wherein the threshold depends on the level of security appropriate for the system. In one embodiment, if the threshold is not met, then the user may be prompted to take the photo/video again.

If the generated biometric hash does not match the stored biometric hash (e.g., the user is not authorized, the device has not been registered with the system so no biometric hashes are stored on the device, the user has not been registered with the system so no biometric hashes are stored on the device, etc.), then, in one embodiment, the system proceeds to the account creation/device association process 300, wherein the identity of the user is confirmed and an account is created or the device that the user is operating is added to the user's account (further details of which will be discussed in association with the description of FIG. 3). If the generated biometric hash does match the stored biometric hash (e.g., the user is authorized to encrypt/decrypt data using that device), then, in one embodiment, the system determines, at step 112, if encryption or decryption of data has been requested.

Thus, in one embodiment, if encryption of data has been requested, then the system proceeds to the message encryption process 400 to encrypt the data (further details of which will be discussed in association with the description of FIG. 4). If, however, in one embodiment, decryption of data has been requested, then the system proceeds to the message decryption process 500 to decrypt the data (further details of which will be discussed in association with the description of FIG. 5). Generally, although processes 400 and 500 refer to encryption/decryption of messages, the system places no limitations on the types of data that may be encrypted/decrypted (e.g., data in motion, in rest, etc.) and messages are referred to herein for ease of discussion.

After the account creation/device association process 300, the message encryption process 400, or the message decryption process 500 is complete, the exemplary system process 200 ends thereafter.

FIG. 3 (consisting of FIGS. 3A and 3B) is a flowchart showing an exemplary account creation/device association process 300, according to one embodiment of the present disclosure. Generally, because each device that a user uses should be registered with the system, the exemplary account creation/device association process 300 is the process by which the identity of the user is confirmed and an account is created or the device that the user is operating is added to the user's account. In various embodiments, FIG. 3A generally corresponds to the device perspective of the exemplary account creation/device association process 300 (e.g., steps occurring on the electronic computing device 101, from FIG. 1). FIG. 3B, in various embodiments, generally corresponds to the server perspective of the exemplary account creation/device association process 300 (e.g., steps occurring on the encryption/decryption management system 103, from FIG. 1).

In various embodiments, the exemplary account creation/device association process 300 begins at step 302, wherein the system optionally confirms the identity of the user by comparing the received photo/video to a government photo identification document (e.g., passport, driver's license, etc.) provided by the user. Generally, if identity confirmation is desired, the user is prompted to take a photograph of a government ID. The photograph is scanned to compare the individual in the received photo/video to the image in the government ID. In one embodiment, the system may be configured to only proceed to step 304 if identity is confirmed, instead terminating the exemplary account creation/device association process 300 if identity cannot be confirmed.

At step 304, in one embodiment, the device transmits the generated biometric hash to the server for generation of an account or association of the device with a previously-generated account. Thus, at step 306 (shown in FIG. 3B), the server receives the generated biometric hash from the device and, at step 308, compares the generated biometric hash with the biometric hashes associated with previously-generated accounts to determine whether an account already exists for the user. Generally, the server determines, at step 310, whether a match has been found for the generated biometric hash. If a match is not found, then the server proceeds at step 312 to generate an account for the user (e.g., storing the individual's data, affiliating the individual with an appropriate entity, etc.). If a match was found at step 310 and after generating an account at step 312, the server, at step 314 in various embodiments, generates at least two device private keys that will serve as private keys in a public-private key encryption/decryption infrastructure, wherein the generated biometric hash is the public key, as well as serving as identifiers for the user/device combination. Accordingly, at step 316, the server stores one of the device private keys (e.g., in the system database 105) in association with the user's account. In one embodiment, at step 316, the server also stores the generated biometric hash in association with the user's account. At step 318, the server transmits a different device private key to the device. As will occur to one of ordinary skill in the art, the server may generate more than two device private keys, storing half and transmitting half, to increase the security of the system by permitting key rotation.

Generally, at step 320 (shown in FIG. 3A), the device receives the different device private key from the server and, at step 322, stores the different device private key and generated biometric hash on the device. Thus, the exemplary account creation/device association process 300 ends thereafter.

FIG. 4 (consisting of FIGS. 4A and 4B) is a flowchart showing an exemplary message encryption process 400, according to one embodiment of the present disclosure. Generally, the exemplary message encryption process 400 is the process by which data is encrypted using the generated biometric hash. In various embodiments, FIG. 4A generally corresponds to the device perspective of the exemplary message encryption process 400 (e.g., steps occurring on the electronic computing device 101, from FIG. 1). FIG. 4B, in various embodiments, generally corresponds to the server perspective of the exemplary message encryption process 400 (e.g., steps occurring on the encryption/decryption management system 103, from FIG. 1). In one embodiment, the exemplary message encryption process 400 may be used to encrypt any data (e.g., documents, photos, songs, videos, files, etc.) or batches of data and not just messages.

In various embodiments, the exemplary message encryption process 400 begins at step 402, wherein the device compares the generated biometric hash with the biometric hash stored on the device (e.g., at step 322 from FIG. 3) to determine whether the user is authorized to encrypt data using the device. If the device determines, at step 404 in one embodiment, that the generated biometric hash does not match the stored biometric hash within a certain predefined threshold (e.g., depending on the level of certainty/security required, indicating the user is not authorized to encrypt data using the device), then the exemplary encryption process 400 ends thereafter. If, however, at step 404 in one embodiment, the device determines that the generated biometric hash matches the stored biometric hash within a certain predefined threshold (e.g., indicating that the user is authorized to encrypt data using the device), then, at step 406, the device generally transmits the generated biometric hash to the server.

At step 408 (as shown in FIG. 4B), in various embodiments, the server receives the generated biometric hash from the device. In one embodiment, at step 410, the server compares the generated biometric hash to the biometric hash stored on the server (e.g., at step 316 from FIG. 3). If the server determines, at step 412 in one embodiment, that the generated biometric hash and the stored biometric hash match within a predetermined threshold (e.g., the user is authorized to encrypt data using the device), then the server proceeds to step 414, wherein, in one embodiment, the server transmits an encryption authorization token (or other form of confirmation) to the device. If, however, the server determines, at step 412 in one embodiment, that the generated biometric hash and the stored biometric hash do not match (e.g., the user is not authorized to encrypt data using the device), then the server proceeds to step 416, wherein, in one embodiment, the server transmits an encryption rejection message to the device, logs the rejection, otherwise denies access to the device, or take another action.

Thus, at step 418 (shown in FIG. 4A), the device generally receives the encryption authorization token or encryption rejection message from the server. If the device receives an encryption authorization token, then, in one embodiment, the device encrypts the requested data (e.g., email, file, batch of files, etc.) using the biometric hash stored on the device (or, as appropriate, the public key/biometric hash of the intended recipient of the data) and takes the appropriate action with the encrypted data (e.g., transmitting the email, storing the encrypted files, etc.). In one embodiment, the device may embed the ciphertext of the encrypted email in the email that it sends so that the recipient does not have to log into a separate system to access the mail. In various embodiments, after encrypting the data at step 420 or after receiving an encryption rejection message at step 418, the exemplary message encryption process 400 ends thereafter.

FIG. 5 (consisting of FIGS. 5A and 5B) is a flowchart showing an exemplary message decryption process, according to one embodiment of the present disclosure. Generally, the exemplary message decryption process 500 is the process by which data is decrypted using the private key stored on the device. In various embodiments, FIG. 5A generally corresponds to the device perspective of the exemplary message decryption process 500 (e.g., steps occurring on the electronic computing device 101, from FIG. 1). FIG. 5B, in various embodiments, generally corresponds to the server perspective of the exemplary message decryption process 500 (e.g., steps occurring on the encryption/decryption management system 103, from FIG. 1).

In various embodiments, the exemplary message decryption process 500 begins at step 502, wherein the device compares the generated biometric hash with the biometric hash stored on the device (e.g., at step 322 from FIG. 3) to determine whether the user is authorized to decrypt data using the device. If the device determines, at step 504 in one embodiment, that the generated biometric hash does not match the stored biometric hash within a certain predefined threshold (e.g., depending on the level of certainty/security required, indicating the user is not authorized to decrypt data using the device, the user is not authorized to decrypt that data, etc.), then the exemplary decryption process 500 ends thereafter (or, in various embodiments, the system logged the denied decryption attempt, prompts the user to take another photo, etc.). If, however, at step 504 in one embodiment, the device determines that the generated biometric hash matches the stored biometric hash within a certain predefined threshold (e.g., indicating that the user is authorized to decrypt data using the device, the user is authorized to decrypt that data, etc.), then, at step 506, the device generally transmits the generated biometric hash to the server.

At step 508 (shown in FIG. 5B), in various embodiments, the server receives the generated biometric hash from the device. In one embodiment, at step 510, the server compares the generated biometric hash to the biometric hash stored on the server (e.g., at step 316 from FIG. 3). If the server determines, at step 512 in one embodiment, that the generated biometric hash and the stored biometric hash match (e.g., the user is authorized to decrypt data using the device, the user is authorized to decrypt that data, etc.), then the server proceeds to step 514, wherein, in one embodiment, the server transmits a decryption authorization token (or other form of confirmation) to the device. If, however, the server determines, at step 512 in one embodiment, that the generated biometric hash and the stored biometric hash do not match (e.g., the user is not authorized to decrypt data using the device, the user is not authorized to decrypt that data), then the server proceeds to step 516, wherein, in one embodiment, the server transmits an decryption rejection message to the device.

Thus, at step 518, the device generally receives the decryption authorization token or decryption rejection message from the server. If the device receives a decryption authorization token, then, in one embodiment, the device decrypts the requested data (e.g., email, file, batch of files, etc.) using the private key stored on the device (e.g., at step 322 from FIG. 3) and takes the appropriate action with the decrypted data (e.g., displaying the email, etc.). In various embodiments, after decrypting the data at step 520 or after receiving a decryption rejection message at step 518, the exemplary message decryption process 500 ends thereafter.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can include various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hard-wired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions include, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically includes one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

What is claimed is:

1. A method, comprising:
    receiving, at a first electronic computing device, liveness media corresponding to a user at the first electronic computing device, wherein the liveness media comprises biometric data of the user captured via the first electronic computing device;
    comparing a biometric hash corresponding to the liveness media to one or more stored biometric hashes of the user at the first electronic computing device to determine a first match if the biometric hash and the one or more stored biometric hashes of the user at the first electronic computing device match within a first predetermined threshold;
    in response to determining the first match within the first predetermined threshold, transmitting the biometric hash to a second electronic computing device that is separate and distinct from the first electronic computing device;
    comparing the biometric hash to one or more stored biometric hashes of the user at the second electronic computing device to determine a second match if the biometric hash and the one or more stored biometric hashes of the user at the second electronic computing device match within a second predetermined threshold; and
    in response to determining the second match within the second predetermined threshold, transmitting encryption or decryption instructions to the first electronic computing device.

2. The method of claim 1, further comprising:
    prior to receiving the liveness media, receiving a user-initiated request for encryption or decryption at the first electronic computing device, the user-initiated request being a request initiated by the user; and
    generating a request for the liveness media at the first electronic computing device for liveness verification of the user.

3. The method of claim 1, wherein the second predetermined threshold corresponds to a predetermined security level of the second electronic computing device.

4. The method of claim 1, wherein the one or more stored biometric hashes of the user at the second electronic computing device comprise initial hashes generated in response to the user establishing an account with the second electronic computing device.

5. The method of claim 4, wherein the initial hashes are generated with initial liveness media.

6. The method of claim 5, wherein two private keys are generated in association with the initial hashes, and wherein a first private key of the two private keys is stored at the second electronic computing device in a user device account, and a second private key of the two private keys is transmitted to the first electronic computing device.

7. The method of claim 6, wherein the encryption or decryption instructions comprise an authorization token for allowing the first electronic computing device to perform the encryption or decryption via the second private key.

8. The method of claim 7, wherein the encryption or decryption are performed on an email, batch of files, or physical asset.

9. The method of claim 1, wherein the liveness media is unique to the user.

10. The method of claim 1, wherein the biometric hash, the one or more stored biometric hashes of the user at the first electronic computing device, and the one or more stored biometric hashes of the user at the second electronic computing device are generated by the SHA-1 and/or MD-5 cryptographic hashing algorithms.

11. The method of claim 1, further comprising the steps of:
    verifying, at the first electronic computing device, the liveness of the user via the liveness media; and
    generating the biometric hash corresponding to the liveness media.

12. A system comprising:
    a processing device; and a non-transitory computer-readable medium comprising instructions stored thereon that, when executed by the processing device, cause the processing device to:

receive biometric data corresponding to a user;

compare a hash corresponding to the biometric data to one or more stored first hashes of the user at an electronic computing device for determining a first match if the hash and the one or more stored first hashes of the user at the electronic computing device match within a first predetermined threshold, the electronic computing device being different from the processing device;

transmit the hash to a separate electronic computing device, wherein the separate electronic computing device is operably configured to compare the hash to one or more stored second hashes at the separate electronic computing device for determining a second match if the hash and the one or more stored second hashes at the separate electronic computing device match within a second predetermined threshold, wherein the second match within the second predetermined threshold provides access to encryption or decryption instructions to access a protected item at the electronic computing device, the separate electronic computing device being different from the electronic computing device and the processing device; and receive the encryption or decryption instructions from the separate electronic computing device in response to the separate electronic computing device determining the second match between the hash and the one or more stored second hashes at the separate electronic computing device.

13. The system of claim 12, wherein the instructions are further executable by the processing device to cause the processing device to:

prior to receiving the biometric data, receive a user-initiated request for encryption or decryption at the electronic computing device, the user-initiated request being a request initiated by the user; and generate a request at the electronic computing device for liveness verification of the user.

14. The system of claim 12, wherein the second predetermined threshold corresponds to a predetermined security level of the separate electronic computing device.

15. The system of claim 12, wherein the one or more stored second hashes at the separate electronic computing device comprise initial hashes generated with initial liveness media in response to the user establishing an account with the separate electronic computing device.

16. The system of claim 15, wherein two private keys are generated in association with the initial hashes, and wherein a first private key of the two private keys is stored at the separate electronic computing device in a user device account, and a second private key of the two private keys is transmitted to the electronic computing device.

17. The system of claim 16, wherein the encryption or decryption instructions comprise an authorization token for allowing the electronic computing device to perform the encryption or decryption via the second private key.

18. The system of claim 12, wherein the hash, the one or more stored first hashes at the electronic computing device, and the one or more stored second hashes at the separate electronic computing device are generated by the SHA-1 and/or MD-5 cryptographic hashing algorithms.

19. A method, comprising:

receiving, at a mobile electronic computing device, liveness media corresponding to a user at the mobile electronic computing device, wherein the liveness media comprises biometric data of the user captured via the mobile electronic computing device;

comparing a biometric hash corresponding to the liveness media to one or more first stored biometric hashes of the user at the mobile electronic computing device to determine a match if the biometric hash and the one or more stored first biometric hashes of the user at the mobile electronic computing device match within a predetermined threshold; and in response to determining the match within the predetermined threshold, receiving encryption or decryption instructions at the mobile electronic computing device.

20. The method of claim 19, comprising:

in response to determining the match within the predetermined threshold, transmitting the biometric hash to a separate electronic computing device, the separate electronic computing device being different from the electronic computing device; and prior to receiving the encryption or decryption instructions at the mobile electronic computing device, comparing the biometric hash to one or more stored second biometric hashes of the user at the separate electronic computing device to determine a second match if the biometric hash and the one or more stored second biometric hashes at the separate electronic computing device match within a second predetermined threshold.

\* \* \* \* \*